United States Patent [19]

Hütter

[11] Patent Number: 5,438,368

[45] Date of Patent: Aug. 1, 1995

[54] SYSTEM FOR THE COMPATIBLE PROCESSING OF A PROGRESSIVELY SCANNED IMAGE SIGNAL IN LINE INTERLACED FORMAT

[75] Inventor: Ingo Hütter, Celle, Germany

[73] Assignee: Deutsche Thomson-Brandt GmbH, Villengen- Schwenningen

[21] Appl. No.: 141,806

[22] Filed: Oct. 22, 1993

Related U.S. Application Data

[63] Continuation of PCT/EP92/00852, Apr. 16, 1992.

[30] Foreign Application Priority Data

Apr. 25, 1991 [DE] Germany .................. 41 13 506.7
Jun. 14, 1991 [DE] Germany .................. 41 19 676.7

[51] Int. Cl.⁶ ............................................. H04N 7/015
[52] U.S. Cl. .................................. 348/434; 348/913; 348/429
[58] Field of Search .............. 348/429, 432, 439, 474, 348/913, 470; H04N 7/015, 11/24

[56] References Cited

U.S. PATENT DOCUMENTS 5,208,670  5/1993  Sugimori et al. ............. 348/913 X
5,227,879  7/1993  Mogita et al. ..................... 348/470

FOREIGN PATENT DOCUMENTS

0432529  6/1991  European Pat. Off. .
9006655  6/1990  WIPO .
9103906  3/1991  WIPO .
9104637  4/1991  WIPO .

*Primary Examiner*—Victor R. Kostak
*Attorney, Agent, or Firm*—Joseph S. Tripoli; Eric P. Herrmann; Ronald H. Kurdyla

[57] ABSTRACT

A system is disclosed for the compatible transmission of a 16:9 progressive scan television signal by means of a letterbox formatted line interlaced signal. The letterbox edge bands contain a vertical helper signal representing the difference between a predicted progressive line and adjacent interlaced lines. Improved resolution of a progressive image at a progressive 16:9 receiver is facilitated by specially arranged half band filters in the transmitter/coder and inverse half band filtering in the receiver. Alternatively, when ordinary low pass filtering is used in the coder prior to interlaced subsampling, the fidelity of a reproduced image is improved using, an approximate simulation of such coder low pass filtering in the decoder together with a correction signal derived therefrom. An image reproduced at the progressive 16:9 receiver can more closely resemble the transmitter source signal by interative processing of the receiver correction signal.

9 Claims, 8 Drawing Sheets

SYSTEM FOR THE COMPATIBLE PROCESSING OF A PROGRESSIVELY SCANNED IMAGE SIGNAL IN LINE INTERLACED FORMAT

This is a continuation of PCT application PCT/EP92/00852 filed Apr. 16, 1992 by Ingo Hutter, titled "Process, Coder and Decoder for Compatible Transmission and/or Recording of Progressively Scanned Picture Signals in Interlaced Format".

BACKGROUND OF THE INVENTION

The invention relates to a system for the compatible transmission and/or recording of progressively scanned picture signals in line interlaced scanning format.

Published European patent application W091/04637 describes a letter-box television system in which 432 active progressively scanned lines are compatibly transmitted, with the aid of a so-called "helper" signal, in line interlaced scanning format. In this system, in addition to losses due to vertical transcoding, ideal horizontal edge information for progressive scan image reproduction cannot be transmitted, resulting in reduced picture quality.

SUMMARY OF THE INVENTION

In accordance with the principles of the present invention, a method is provided for the compatible transmission of progressively scanned picture signals in line interlaced format, with improved quality of a reconstructed, reproduced picture signal.

The method according to the invention uses a helper signal obtained at the transmitter by using vertical filtering. The helper signal is simultaneously transmitted and/or recorded with the picture signal and, during reproduction, progressive picture signals are reconstructed using the helper signal. Either of two techniques may be used to this end. In one case, during coding at the transmitter, picture element (pixel) values for lines to be transmitted/recorded are vertically pre-filtered with a half band filter so that only a pixel value from a current line, and pixel values located vertically above and below lines ($P2_i$, $P4_i$ ... ) which are not transmitted/recorded, are used. During decoding at a receiver, pixel values from transmitted/recorded lines are vertically filtered with a filter that is the inverse of the half band filter used at the transmitter, for removing the low pass effect of the transmitter half band filter.

Alternatively, a receiver decoder may use a vertical filter with a characteristic similar to that of a vertical filter used at the transmitter to produce a difference picture signal between compatible lines so vertically filtered at the transmitter, and corresponding lines which were filtered with the same filter characteristic of a picture signal that was progressively reconstructed at the decoder, and is added to a picture signal which is progressively reconstructed at the decoder.

An embodiment of a coder in accordance with the invention includes a first vertical transcoder with a 3/4 transcoding factor, coupled to a vertical half band filter, which is coupled to an interlace sub-sampler for providing a synthesized interlaced output picture signal. A first vertical interpolator converts interlaced pictures into progressive scan pictures, and a subsequent first subtractor subtracts output signals from this first vertical interpolator from output signals of the first vertical transcoder. A second interlace sub-sampler follows the first subtractor, to which there is subsequently connected a helper signal coder which performs a horizontal 3:1 transcoding together with, e.g., an amplitude reduction and/or ultra black (blacker-than-black) modulation of auxiliary information, and arranges the auxiliary information in the upper and lower edge bands of the letter box format.

One embodiment of a decoder in accordance with the invention includes a helper signal decoder which horizontally 1:3 transcodes together with, e.g., increasing the amplitude and/or the ultra black demodulation of the auxiliary information, and extracts the auxiliary helper information from the edge bands of the letter box format; a subsequent adder and a second vertical interpolator for developing progressive picture signals; a subsequent line blanking circuit whose output signal is also supplied to the adder; a second subtractor in which an output signal from the adder, received via a filter that is the inverse of the half band filter at the coder, are subtracted from the input signal of the second vertical interpolator; a line interleaver connected after the second subtractor and the adder and in which the lines of the output signals of the adder are combined with corresponding lines of amplitude adjusted output signals of the second subtractor to produce progressive picture signals; and a subsequently connected second vertical transcoder which provides output picture signals having a format corresponding to source signals at the coder.

Another embodiment of a decoder in accordance with the invention includes a helper signal decoder which horizontally 1:3 transcodes the helper signal together with, e.g., increasing the amplitude and/or the ultra black demodulation of auxiliary helper information as extracted from the edge bands of the letterbox format; a subsequently connected first interpolator which converts the auxiliary helper information into a progressive picture signal and supplies such signal to a first adder in which lines of the transmitted/recorded main signal that have been likewise converted back into a progressive picture signal by a second interpolator are combined; a subsequently connected second adder; a subsequently connected transcoder for vertical expansion by a factor 4/3; a vertical low pass filter, having a filter characteristic corresponding to the low pass filter characteristic of a vertical filter used at the coder, connected subsequent to the output of the first adder; and a subsequently connected line suppressing (blanking) circuit whose output signal is subtracted in a second subtractor from the input signal of the second interpolator, which is provided via a padding circuit and which is also supplied to the second adder.

It is expected that in a future 16:9 letterbox receiver, only the lines of a compatible interlace scan picture will be directly available. The other lines for reproducing a progressive scan picture will have to be additionally transmitted with reduced redundancy and irrelevancies. To this end, for example, a 625L/16:9 aspect ratio progressive source signal with 576 active lines is vertically transcoded by a factor of 3/4. A compatible letter box picture signal having 432 active lines is obtained from the thus produced 432 active lines by synthetic line interlacing, whereby a helper signal is generated with which 432 progressive lines can be reconstructed in a 16:9 receiver together with the compatibly transmitted interlace lines. By means of additional vertical transcoding by a factor of 4/3 at a receiver, 576 active progressive lines can be reconstructed from these 432 active lines. To generate the helper signal, the "progressive"

line lying between lines of adjacent interlace lines is predicted. The difference between this predicted line and the actual "progressive" line coded within the letter box edge bands is also transmitted. Because only 576−432=144 lines are available for transmission in the edge bands, but 432 such helper signal lines are to be incorporated therein, time compression in the edge bands by a factor 3 is used at the coder (3×144=432). Corresponding time expansion is used at a decoder in a receiver.

In a method of this type, loss of picture quality can occur at the following places. (1) Vertical resolution is reduced due to transcoding by 3/4 in the coder, and by 4/3 in the decoder. However, because of the Kell effect, these errors are usually not noticeable. (2) Error-free recovery of the helper signal in a 16:9 receiver is not possible since only a limited channel capacity is available for conveying the helper signal. For this reason the helper signal is time compressed before transmission. Corresponding distortions also appear in a reconstructed picture. (3) Error-free reconstruction of the progressive input picture in a receiver using previously proposed methods and standard filters would be possible if ideal filters were used, even if the helper signal were transmitted without loss. Lines which were not transmitted due to vertical sub-sampling could be perfectly reconstructed with the usual filters, but this is not possible for the compatibly transmitted lines.

By using a specially arranged half band filter in the coder and corresponding inverse filtering in the decoder, as will be discussed, it is possible to avoid the errors mentioned in item (3) above.

Alternatively, even when using known filters, coding errors can be estimated and corrected by predicting or estimating in the decoder the signal processing at the coder. Errors as mentioned in item (3) above can thereby be avoided. This estimation and correction may also be accomplished iteratively, whereby reconstruction errors at the decoder may be reduced even further.

DETAILED DESCRIPTION

Figure 1:
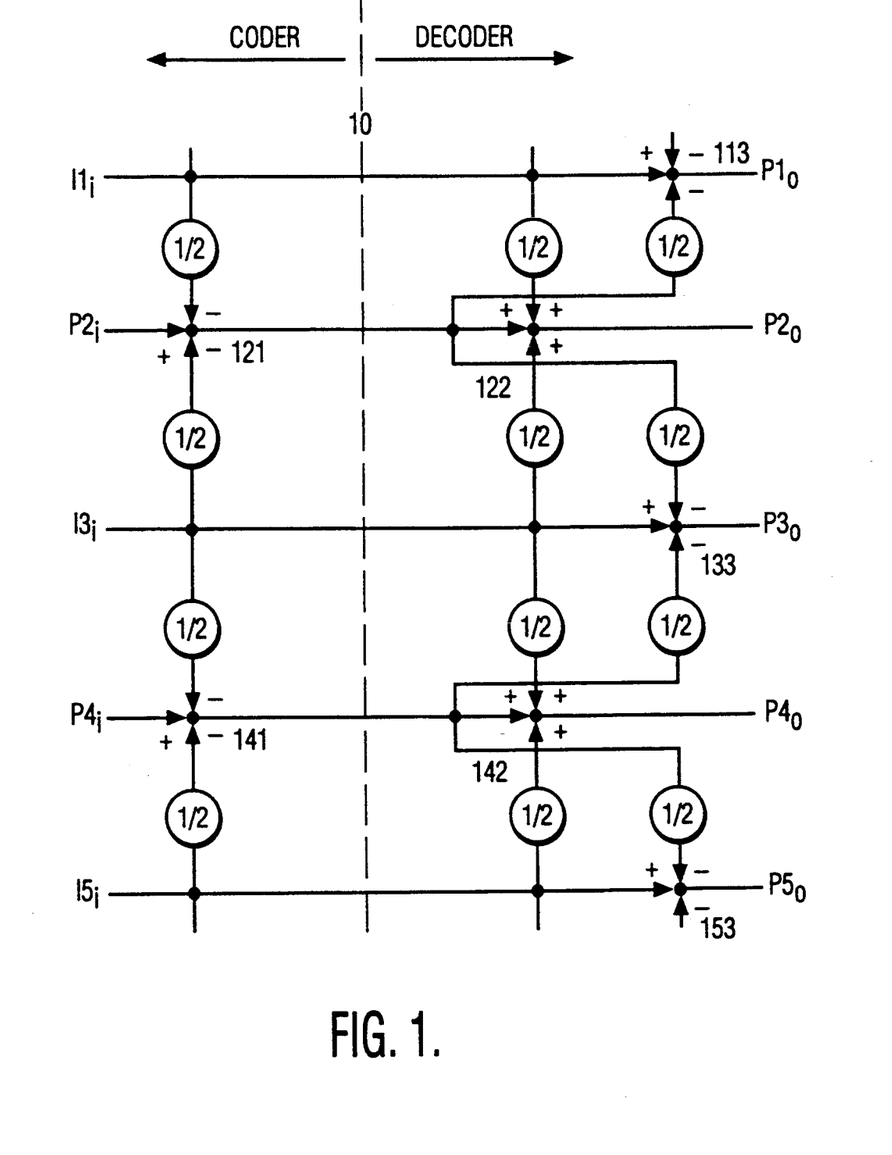
FIG. 1 illustrates a technique for forming progressive image signals from compatibly transmitted interlace image signals in accordance with the invention.

FIG. 1 shows details of progressive picture signal lines that are to be formed in a receiver. By means of (not illustrated) pre-filtering, every other line simultaneously represents a compatibly transmitted line in the interlace scan format. Coder processing is illustrated to the left of a transmission channel 10, and decoder processing is illustrated to the right of transmission channel 10.

Lines associated with input signals $I1_i$, $I3_i$, $I5_i$, ... which have already been vertically pre-filtered with conventional low pass filters, are transmitted unaltered within a field and are thereby compatible. The half values of two picture elements (pixels) from adjacent lines $I1_i$, $I3_i$, $I5_i$, ... located thereabove and therebelow, are respectively subtracted, in correspondingly arranged subtractors 121, 141, ..., from the signal value in lines associated with input signals $P2_i$, $P4_i$, .... The output signals from these subtractors are horizontally compressed (not illustrated) by a factor of three, and transmitted as a vertical helper signal in the lines of the letter box upper and lower edge bands.

Figure 2:
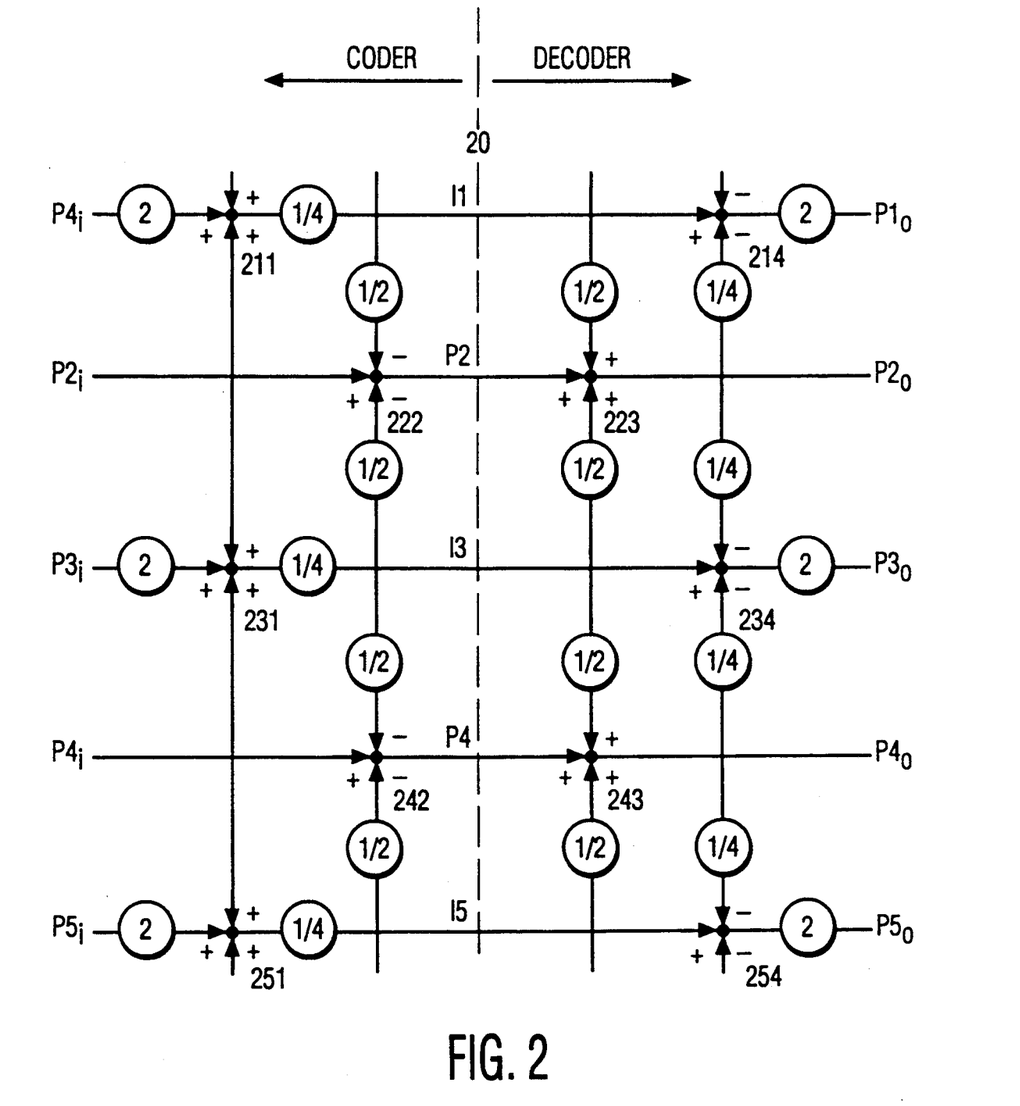
FIG. 2 illustrates an improved technique for forming progressive image signals from compatibly transmitted interlace image signals.
Figure 3:
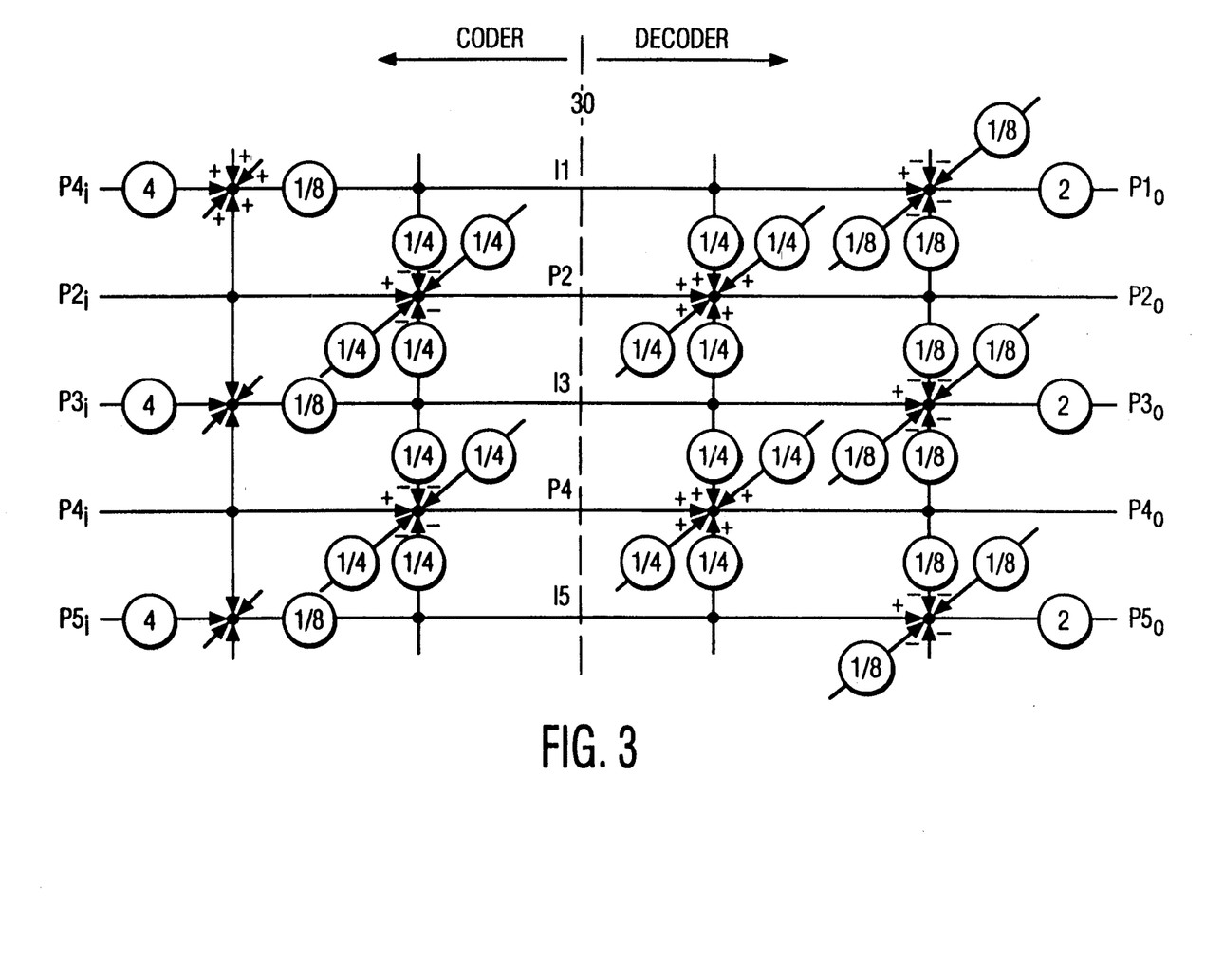
FIG. 3 is a three dimensional representation illustrating the formation of progressive image signals from compatibly transmitted interlace image signals.

The circular elements in FIGS. 1, 2 and 3 each represent multiplication by the factor specified within the element, e.g., 1/2. At a decoder, the helper signal is initially expanded (not illustrated) by a factor of three. The half values of the two pixels from adjacent lines $I1_i$, $I3_i$, $I5_i$, ... located thereabove and therebelow are respectively added again, in correspondingly arranged adders 122, 142, ..., to the values in the helper signal lines corresponding to input signals $P2_i$, $P4_i$ ... whereby corresponding output signals $P2_o$, $P4_o$, ... result. For example:

$$P2_o = P2_i - I1_i/2 - I3_i/2 + I1_i/2 + I3_i/2 = P2_i$$

The half values of the two pixels from adjacent lines $P2_i$, $P4_i$, ... located thereabove and therebelow can be respectively subtracted, in correspondingly arranged subtractors 113, 133, 153, ..., from the values in the interlace lines corresponding to input signals $I1_i$, $I3_i$, $I5_i$, ... in order to virtually compensate a high frequency loss arising from the prefiltering, whereby corresponding output signals $P1_o$, $P3_o$, $P5_o$, ... occur. For example:

$$P3_o = I3_i - 0.5*(P2_i - I1_i/2 - I3_i/2 + P4_i - I5_i/2 - I3_i/2) = I1_i/4 - P2_i/2 + 3*I3_i/2 - P4_i/2 + I5_i/4.$$

However, unless special measures are taken, a resulting frequency response is not linear and causes the previously mentioned reduction in picture quality during progressive image reception.

FIG. 2 illustrates details of progressive scan lines of a picture signal. Coder processing occurs to the left of a transmission channel 20, and decoder processing occurs to the right of transmission channel 20.

Lines associated with input signals $P1_i$, $P3_i$, $P5_i$, ... are prefiltered by a 1-2-1 filter and form compatibly transmitted interlace lines I1, I3, I5, .... The values of the two pixels from adjacent lines $P2_i$, $P4_i$, ... located thereabove and therebelow are respectively added, in adders 211, 231, 251, ..., to the doubled value of a pixel in these lines. The output signal of each respective adder is multiplied by a factor of 1/4. The half value of two pixels from adjacent interlace lines I1, I3, I5, ... located thereabove and therebelow is respectively subtracted, in correspondingly arranged subtractors 222, 242, ..., from the value of pixels of lines associated with input signals $P2_i$, $P4_i$, .... Output signals P2, P4, ... of these subtractors are horizontally compressed by a factor of three (not illustrated) and transmitted as a vertical helper signal in the lines of the letterbox edge bands.

In the decoder, the helper signal is initially time expanded by a factor of three (not illustrated). The half value of two pixels from adjacent interlace lines I1, I3, I5, . . . located thereabove and therebelow is respectively added, in correspondingly arranged adders 223, 243, . . . , to the values in the helper signal lines corresponding to re-formed output signals P2, P4, . . . whereby corresponding output signals $P2_o$, $P4_o$, . . . occur. For example:

$$P2_o = P2 + I1/2 + I3/2 + = P2_i - I1/2 - I3/2 + I1/2 + I3/2 = P2_i$$

A quarter of the value of the two pixels from adjacent output signals P2, P4, . . . located thereabove and therebelow is respectively subtracted, in correspondingly arranged subtractors 214, 234, 254, . . . , from pixel values corresponding to interlace lines I1, I3, I5, . . . . Output signals of subtractors 214, 234, 254, . . . are respectively multiplied by a factor of two, whereby corresponding output signals $P1_o$, $P3_o$, $P5_o$, . . . occur. For example:

$$P3_o = 2*(I3 - P2_o/4 - P4_o/4) = 2((2*P3_i + P2_i + P4_i)/4 - P2_i/4 - P4_i/4 = 2*(P3_i/2) = P3_i.$$

Half band vertical filters are used for the improved technique shown in FIG. 2. A half band vertical filter is a digital low pass vertical filter which exhibits a —6 db attenuation response at frequency fs/4, where fs is the sampling frequency. A half band filter having coefficients A, B, C, D, E, . . . generally has the following form.

. . . EODOCOBABOCODOE. . .

The simplest form of such a half band filter, a so-called 1-2-1 filter, is used in FIG. 2 for obtaining interlace lines I1, I3, I5, . . . Such a filter has coefficients B A B. Due to the use of a half band filter for this low pass filtering at the transmitter/coder, the values in interlace lines I1, I3, I5, . . . are only obtained from the current lines themselves and from the subsequently scanned lines having output signals P2, P4, . . . .

The following discussion considers one line "n" of the progressive source picture which is transmitted, after low pass filtering at the transmitter, in the compatible picture. By using a half band filter with coefficients A, B, C and D, the luminance L(n) of filtered line n is expressed as:

$$L_f(n) = D*L(n-5) + C*L(n-3) + B*L(n-1) + A*L(n) + B*L(n+1) + C*L(n+3) + D*L(n+5)$$

The luminance $L_r$ of lines n—5, n—3, n—1, n+1, n+3 and n+5 can be recovered in a receiver with the help of the helper signal. The luminance $L_r(n)$ of reconstructed line n is expressed as:

$$L_r(n) = (-D*L_r(n-5) - C*L_r(n-3) - B*L_r(n-1)L_f(n) - B*L_r(n+1) - C*L_r(n+3) - D*L_r(n+5))/A.$$

FIG. 3 illustrates a technique based on that shown in FIG. 2. Corresponding multiplied pixel values of time-adjacent pictures are additionally applied to the adders and subtractors. Vertical image resolution corresponding to that of the progressive picture can thereby be achieved for static pictures in the compatible picture.

The multiplication factors are matched to the corresponding indications in the drawing.

Figure 4:
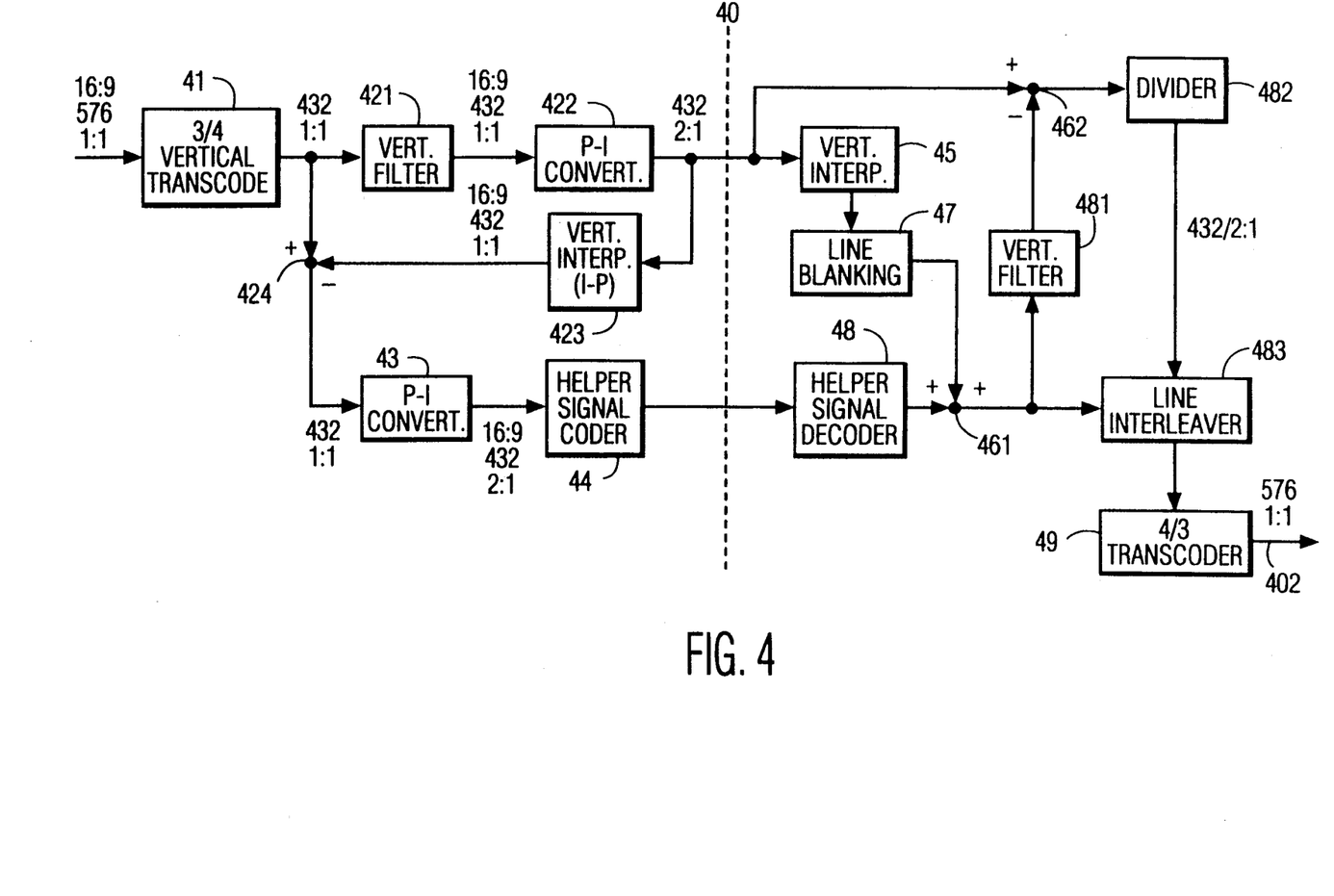
FIG. 4 is a block diagram of coder and decoder apparatus in accordance with the invention.

FIG. 4 is a block diagram of coder and decoder apparatus in accordance with the invention. A progressive scan (1:1), widescreen 16:9 aspect ratio picture signal having 576 active lines is supplied to input 401 from a picture source. The pictures are vertically transcoded in a first transcoder 41 by a factor 3/4 into 432 active lines, and are vertically pre-filtered by a half band filter 421 prior to progressive-to-interlace conversion. This progressive-interlace conversion occurs in a first interlace sub-sampler 422 which produces an output synthetic interlace signal representing pictures with a 16:9/432L/2:1 (432 active lines) format. Thereafter, using known techniques, the 16:9 aspect ratio pictures are arranged within a compatible 4:3 aspect ratio format corresponding to the letter box format (not illustrated).

The helper signal (P2, P4 . . . ) for reconstructing the progressive picture signals in a 16:9 receiver is obtained as follows. Output signals from first interlace sub-sampler 422 are again converted, by a first vertical interpolator 423, to a 16:9/432L/1:1 progressive format and are subtracted from output signals of first transcoder 41 in a subtractor 424 (corresponding to subtractors 222, 242, . . . in FIG. 2). An output difference signal from subtractor 424 is converted by a second interlace sub-sampler 43 into a 16:9/432L/2:1 interlaced format so that those helper signal lines are made available which do not belong to compatibly transmitted interlace lines I1, I3, I5, . . . . In order to be able to compatibly transmit the helper signals as auxiliary items of information, e.g., in the letter box edge bands, a coder 44 subjects the helper signal to processing including, for example, horizontal 3:1 transcoding (line compression), amplitude reduction and ultra black (blacker-than-black level shift) modulation, whereby auxiliary items of information including the helper signal are arranged in the edge bands of the letter box format (not illustrated).

Corresponding inverse signal processing takes place in helper decoder 48 in a receiver/decoder. The output signal in the 432L/2:1 interlaced format is supplied to an adder 461 which corresponds to adders 223, 243, . . . in FIG. 2. The 432L/2:1 main signal from unit 422 likewise reaches adder 461 via a second vertical interpolator 45 and a line blanking circuit 47. The average values of corresponding picture elements from respective adjacent interlace lines I1, I3, I5, . . . are formed in vertical interpolator 45, and the interlace lines are suppressed by blanking circuit 47. Reconstructed lines $P2_o$, $P4_o$, . . . , from adder 461 are supplied to a line interleaver 483 and to a filter 481 which is the inverse of half band filter 421 at the coder. Output signals from inverse filter 481 are subtracted in a subtractor 462 from the 432L/2:1 main signal from unit 422 before being applied to a multiplier network 482. Subtractor 462 corresponds to subtractors 214, 234, 254, . . . of FIG. 2. Multiplier network 482 normalizes the output signal of subtractor 462 again and passes the normalized signal to line interleaver 483 with a 432L/2:1 format. In this example multiplier network 482 exhibits a multiplier factor of 2, and encompasses the multiplier elements shown along the fight side of FIG. 2. The missing lines generated with the help of the helper signal are re-inserted into the corresponding corrected lines of the main signal in line interleaver 483, resulting in a picture signal with a 432L/1:1 format. Output signals from line interleaver 483 may be vertically transcoded in a subsequent second transcoder 49 with a factor of 4/3, thereby regenerating a progressive picture signal with 576 active lines at output 402.

A 1—1 filter may be used for interpolation in coder vertical interpolator 423 and in decoder vertical interpolator 45. With such a filter the average value of adjacent lines is calculated for interpolation.

In a corresponding manner, the coder and the decoder can be matched if a two dimensional vertical temporal filter as shown in FIG. 3 is used.

Figure 5:
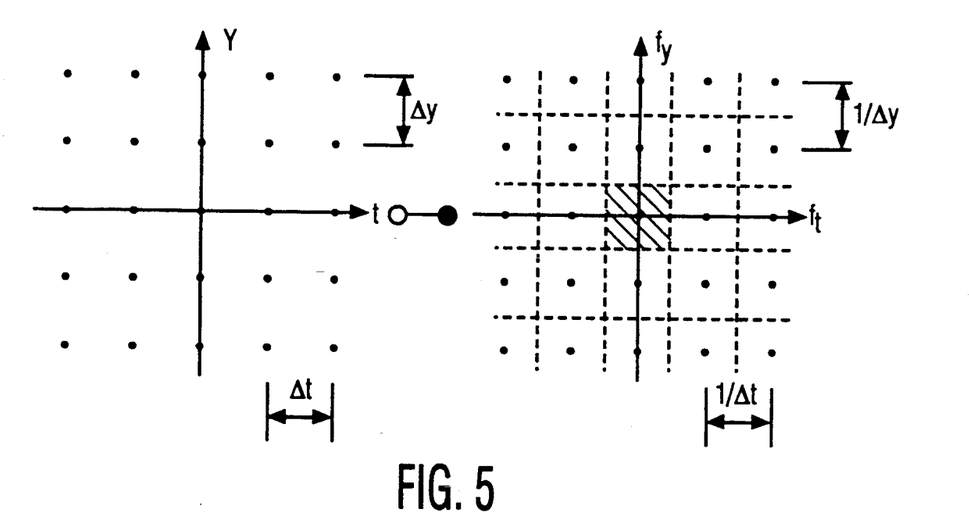
FIG. 5 illustrates the scanning raster and the spectral range in the $f_y$-$f_t$ plane for a progressive source.

FIG. 5 shows the scanning raster for a progressive picture signal source in the y-t plane (left diagram), and the associated representation in the frequency domain (right diagram). The base band region is shown hatched.

Figure 6:
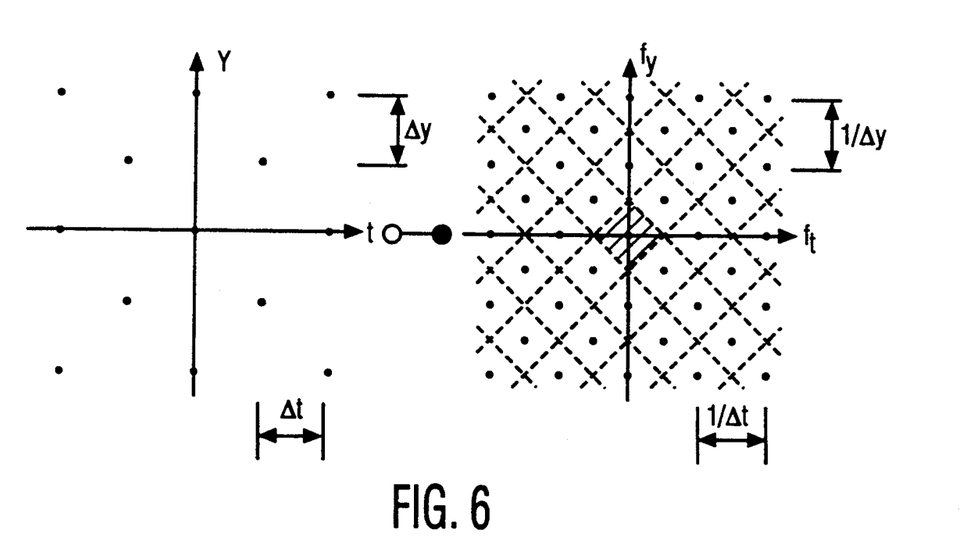
FIG. 6 illustrates the scanning raster and spectral range in the $f_y$-$f_t$ plane for a technique in accordance with FIGURE 3.
Figure 7:
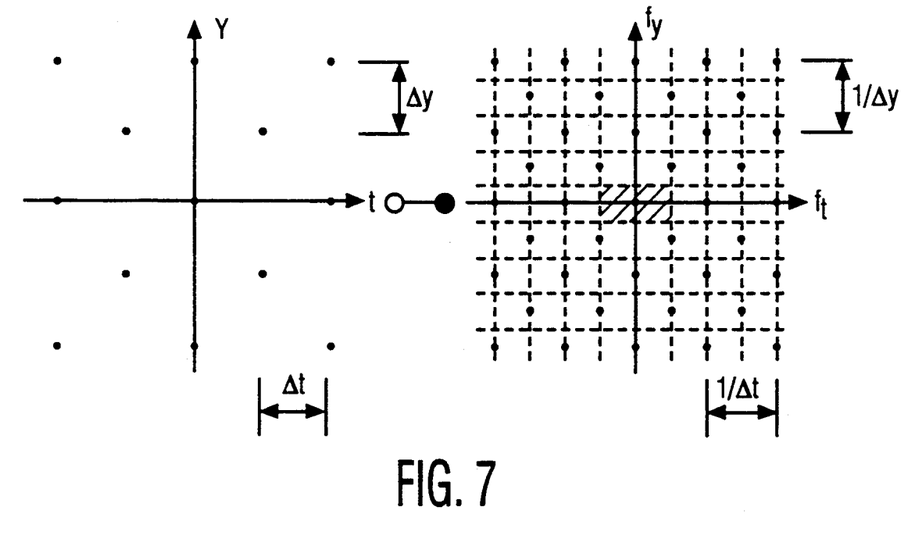
FIG. 7 illustrates the scanning raster and the spectral range in the $f_y$-$f_t$ plane for a technique in accordance with FIG. 2.

If an interlaced signal is to be obtained from a progressive picture signal, the progressive picture has to be vertically-temporally filtered such that aliasing does not appear. This can be effected, for example, by vertical-temporal filtering in accordance with FIG. 6, or by vertical-filtering in accordance with FIG. 7. In each case, the corresponding scanning raster is again illustrated on the left, and the associated frequency range is shown on the right. Filtering of this type is performed by low pass half band vertical filter 421 in FIG. 4. For the scheme shown in FIG. 3 band limiting by filter 421 in accordance with FIG. 6 is advantageous, and for the scheme shown in FIG. 2, band limiting by filter 421 in accordance with FIG. 7 is advantageous. The described half band filter having coefficients A B C D E of the form mentioned previously can exhibit the following coefficients values:

$$A=256/512, B=158/512, C\times-40/512,$$
$$D=-13/512, E=-3/512.$$

Figure 8:
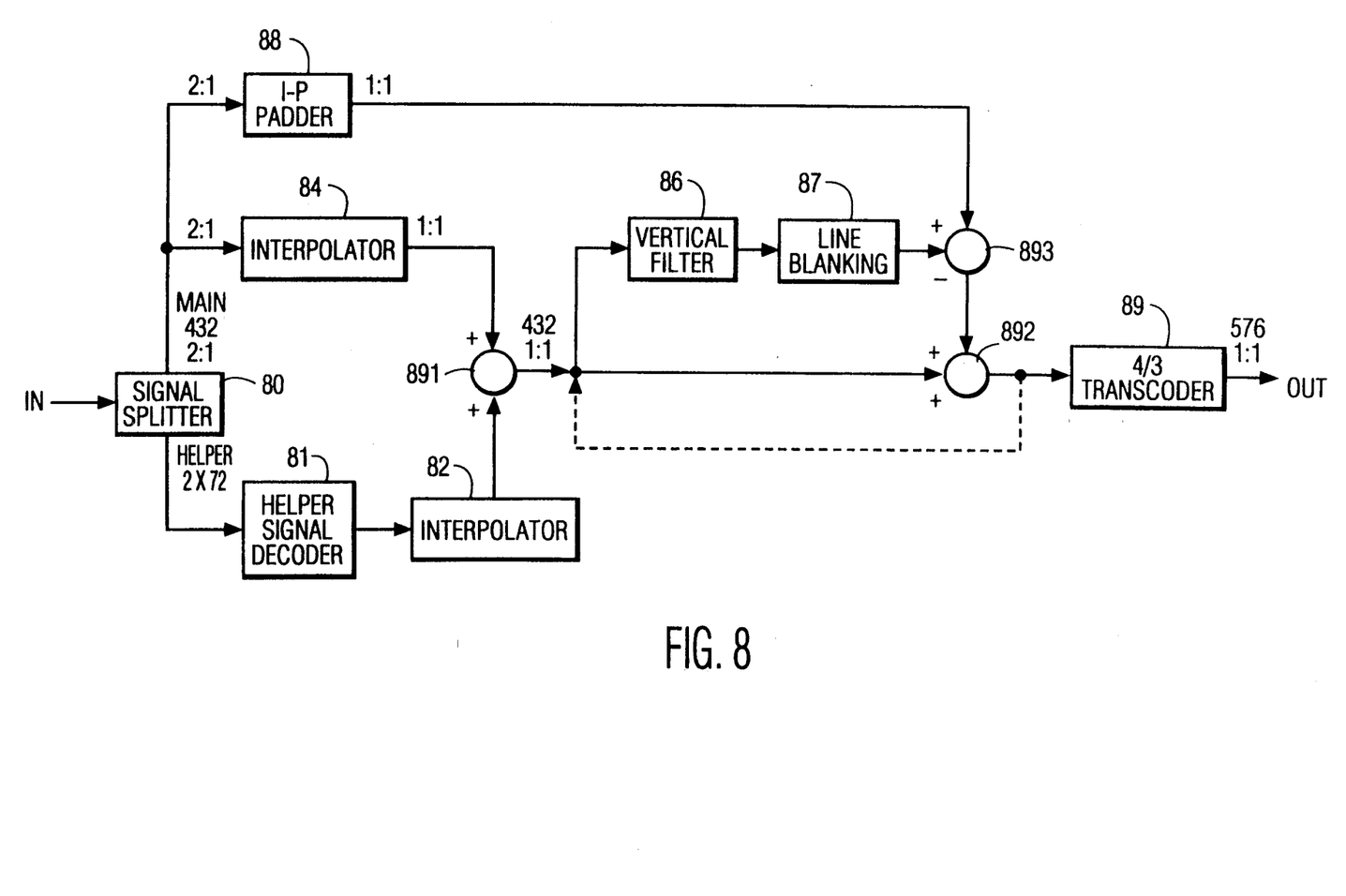
FIG. 8 is a block diagram of alternative decoder apparatus according to the present invention.
Figure 9:
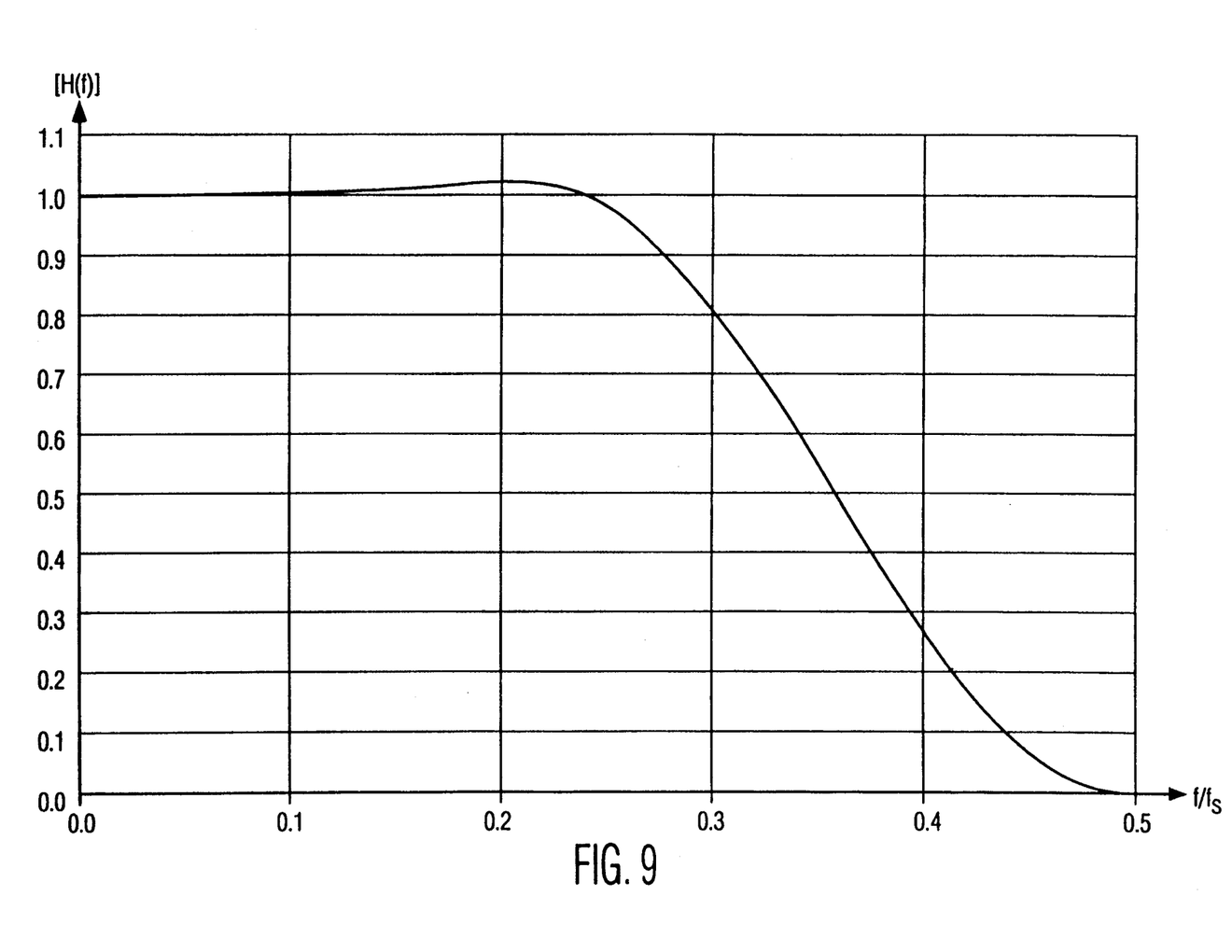
FIG. 9 depicts a low pass filter frequency response.

A decoder in accordance with FIG. 8 likewise delivers improved picture quality in a 16:9 receiver if a coder of the type described in W091/04637 is used at the transmitter. The encoder of W091/04637 is identical to the encoder shown in FIG. 4 except that a filter corresponding to filter 421 is not a half band filter. Instead, in W091/04637, such filter is a low pass filter with an extended pass band as shown in FIG. 9. A signal having been sub-sampled by a half band filter can be reconstructed as a progressive scan signal without loss when a vertical helper signal is also transmitted. In a system which does not use a half band vertical filter at the transmitter/encoder, the alternative decoder embodiment of the invention shown in FIG. 8 will produce good results in reconstructing a progressive signal, particularly when an iterative reconstruction process is used. In this case, a vertical filter used at the receiver/decoder exhibits characteristics similar to the vertical filter used at the transmitter/encoder (e.g., as in the use of a low pass filter in W091/04637).

In FIG. 8, a received letter box signal is split into a main signal component having 432 active lines and a helper signal component having 2*72 lines by means of a splitting circuit 80. A decoder 84 decodes the helper signal in accordance with the coding at the transmitter. A difference signal having 432 active lines which is present in the interlace raster is converted into a progressive picture signal in a first interpolator 82, and combined in a first adder 891 with the main signal which has been converted into a progressive picture signal by a second interpolator 84. A reconstructed progressive picture signal having 432 active lines is produced at the output of adder 891. This signal is supplied to a first input of a second adder 892, a second input of which receives an output signal from subtractor 893. An output signal from adder 892 is vertically expanded by 4/3 into a progressive picture signal having 576 active lines by means of a transcoder 89.

With the elements of the FIG. 8 decoder thus far described, the lines separated during interlace sub-sampling at the transmitter can be reconstructed (apart from transmission errors) without error. However, the effects of errors introduced by low pass filtering at the transmitter on the (compatibly) transmitted lines remains. In order to reduce this error, the reconstructed picture at the output of first adder 891 is vertically filtered by a low pass filter 86 in accordance with the characteristics of the low pass filtering at the transmitter. Afterwards, the pixel values of lines which were not transmitted are suppressed by a line suppressing (blanking) circuit 87, or the pixels values may be set to 0. The received interlace main picture is converted to a progressive picture by a padding circuit 88, in which lines having zero value pixels are inserted between the transmitted lines. The difference of the two output signals from padding circuit 88 and line blanking circuit 87 is obtained by a subtractor 893 and supplied to the second input of adder 892.

The output signal of subtractor 893 is calculated from the transmitted vertically low pass filtered compatible lines, and from the corresponding low-pass filtered reconstructed lines, using the same low pass filter in each case. This output signal represents the difference between the transmitted (low pass filtered) compatible lines, and the corresponding reconstructed lines of the decoder.

Although reconstruction errors of adjacent lines also occur in the vertical low pass filtering, the difference picture signal at the output of subtractor 893 is a good approximation of the actual error. Consequently, reconstruction errors are reduced if the estimated error signal is added to the reconstructed picture signal in second adder 892.

Advantageously, remaining errors can be significantly reduced by iterative use of the above-described processing. This iterative processing is indicated by the dashed line representing feedback from the input of transcoder 89 to the first input of adder 892. Output progressive signals from unit 89 are applied to conventional signal processing circuits, e.g., luminance and chrominance processing circuits, of a 16×9 progressive scan receiver.

FIG. 9 shows the frequency response of known low pass filtering at the transmitter before interlace sub-sampling and thus also before low pass filter 86 at the receiver decoder (FIG. 8). This low pass filter is used in the system of W091/04637 and exhibits an extended pass band and has the following coefficients: −1/256, 2/256, 6/256, −31/256, 59/256, 186/256, 59/256, −31/256, 6/256, 2/256, −1/256. For other picture formats, e.g., 525L/60 Hz/2:1, the coefficient values can be adapted as necessary.

I claim:

1. A method for decoding an input compatible progressive picture signal exhibiting a letter-box format, and including a helper signal to help reconstruct a progressive picture signal at a decoder, said input progressive picture signal representing image lines containing picture elements (pixels) having been subjected to vertical filtering at a coder whereby pixel values from a current line and pixel values from lines located vertically above and below said current line which are not transmitted are used; said decoding method including the step of:

(a) vertically filtering pixel values of a progressive picture signal with a half band vertical filter exhibiting the inverse response of a picture signal half band vertical filter at a coder, whereby said inverse half band vertical filter removes low pass effects caused by vertical filtering at said coder; or the steps of:

(b1) filtering a progressive picture signal with a vertical filter characteristic similar to that of a picture signal vertical filter at a coder;

(b2) producing a difference picture signal representing a difference between compatible lines so vertically filtered at said coder, and corresponding lines of a reconstructed progressive picture signal filtered with said similar vertical filter characteristic; and (b3) adding said difference picture signal to said reconstructed progressive picture signal.

2. A decoding method according to claim 1 including the steps of obtaining an average value of pixels above and below two adjacent lines; and adding said average value to a current value of a decoded helper signal.

3. A decoding method according to claim 2, wherein said steps of inverse half band vertical filtering and obtaining said average value use pixel values which are adjacent in time to a current pixel.

4. A decoding method according to decoding steps (b1)–(b3) of claim 1, wherein said steps of producing and adding said difference picture signal employ an iterative process.

5. A decoding method according to claim 1, including the further step of horizontally expanding said helper signal by a factor of approximately three.

6. A decoding method according to claim 1, including the further step of expanding the amplitude of said helper signal.

7. A method for coding a compatible progressive picture signal in letter-box format including a helper signal, including the steps of:

vertically transcoding a progressive picture signal by a factor of approximately 3/4 to produce a transcoded progressive picture signal;

vertically filtering said transcoded picture signal with a vertical half-band filter to produce a vertically filtered signal;

sub-sampling said vertically filtered signal to produce a synthetic interlaced signal;

vertically interpolating said interlaced signal for converting said interlaced signal into a progressive picture signal;

subtracting said progressive picture signal produced by said vertical interpolation from said transcoded progressive picture signal to produce a difference signal;

subsampling said difference signal to produce an interlaced difference signal corresponding to a helper signal; and coding said helper in letterbox format to produce a coded helper signal horizontally 3:1 transcoded in edge bands of said letterbox format and exhibiting reduced visibility in said edge bands.

8. A method for decoding an input compatible picture signal exhibiting a letter-box format including a coded helper signal, including the steps of:

decoding said helper signal by horizontally 1:3 transcoding said helper signal, enhancing the magnitude of said helper signal, and extracting said helper signal from edge bands of said letterbox format to produce a decoded helper signal;

conveying said decoded helper signal to an adder;

vertically interpolating said input compatible picture signal to produce a first progressive picture signal;

blanking predetermined lines of said first progressive picture signal to produce a line blanked picture signal;

conveying said line blanked picture signal to said adder;

filtering an output signal from said adder with a half-band vertical filter having a response which is the inverse of a response of a vertical half-band picture signal filter used at a coder, to produce a filtered signal;

subtracting said filtered signal from said input compatible picture signal to produce a difference signal;

interleaving lines of said difference signal with lines of said output signal from said adder to produce a second progressive picture signal; and vertically transcoding said second progressive picture signal to produce an output progressive picture signal having a format and number of lines corresponding to source signals coded by said coder.

9. A method for decoding an input compatible picture signal in letter-box format including a coded helper signal, including the steps of:

separating said input compatible picture signal into a picture signal and a helper signal;

decoding said helper signal by horizontally 1:3 transcoding said helper signal, enhancing the magnitude of said helper signal, and extracting said helper signal from edge bands of said letterbox format to produce a decoded helper signal;

interpolating said decoded helper signal to produce a progressive helper signal;

interpolating said picture signal to produce a progressive picture signal;

adding said progressive picture signal and progressive helper signal to produce a combined progressive signal;

filtering said combined progressive signal with a low pass vertical picture signal filter having a response which is similar to that of a low pass vertical filter used at a coder, to produce a filtered signal;

blanking predetermined lines of said filtered signal to produce a line blanked signal;

converting said picture signal from said separating means into a progressive picture signal;

subtracting said line blanked signal from said progressive picture signal to produce a difference signal;

adding said difference signal to said combined progressive signal to produce an augmented progressive picture signal; and vertically transcoding said augmented progressive picture signal to produce an output progressive picture signal.

* * * * *